(12) United States Patent
Lovell

(10) Patent No.: US 12,504,773 B2
(45) Date of Patent: Dec. 23, 2025

(54) LOW BLEED FLUID CONTROL SYSTEM

(71) Applicant: Fisher Controls International LLC, Marshalltown, IA (US)

(72) Inventor: Michel Ken Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 155 days.

(21) Appl. No.: 18/363,468

(22) Filed: Aug. 1, 2023

(65) Prior Publication Data

US 2025/0044814 A1    Feb. 6, 2025

(51) Int. Cl.
*G05D 7/06* (2006.01)
*F16K 31/40* (2006.01)
*F17D 3/01* (2006.01)

(52) U.S. Cl.
CPC ......... *G05D 7/0635* (2013.01); *F16K 31/406* (2013.01); *F17D 3/01* (2013.01)

(58) Field of Classification Search
CPC ............. G05D 7/0635; G05D 16/2097; G05D 16/166; Y10T 137/777
See application file for complete search history.

(56) References Cited

U.S. PATENT DOCUMENTS

| | | |
|---|---|---|
| 9,400,060 B2 | 7/2016 | Garvey et al. |
| 10,234,047 B2 | 3/2019 | Garvey et al. |
| 10,876,645 B2 | 12/2020 | Garvey et al. |
| 11,125,350 B2 | 9/2021 | Johanning et al. |
| 2008/0149186 A1* | 6/2008 | Martin ................. G05D 7/0647 137/85 |

OTHER PUBLICATIONS

Emerson Automation Solutions, EZH and EZHSO Series Pressure Reducing Regulators, https://www.emerson.com/documents/automation/data-sheets-ezh-ezhso-series-pressure-reducing-regulators-bulletin-fisher-en-en-5903256, Bulletin 71.2, Jul. 2023, printed Feb. 8, 2024, 28 pages.

Emerson Automation Solutions, Fisher Fieldvue DVC6200 Digital Valve Controller, https://www.emerson.com/documents/automation/instruction-manual-fieldvue-dvc6200-hw2-digital-valve-controller-en-123052.pdf, Instruction Manual, Dec. 2022, printed Feb. 8, 2024, 108 pages.

(Continued)

*Primary Examiner* — Michael R Reid
(74) *Attorney, Agent, or Firm* — Quarles & Brady LLP

(57) ABSTRACT

A fluid control system is provided for controlling flow of a process fluid through a pipeline. The fluid control system can include a valve arranged to control a flow of process fluid, an actuator configured to adjust a position of the valve, and a controller configured to control movement of the actuator. The system may include a switching valve in communication with the actuator and the controller. Further, a solenoid valve may be in communication with a first port of the switching valve. In one example, depending on pressure at the first port of the switching valve, the switching valve is operable in a first state to provide process fluid to the valve controller and permit movement of the actuator and in a second state to block flow of process fluid to the valve controller and block flow of process fluid from the pneumatic actuator.

20 Claims, 3 Drawing Sheets

(56) References Cited

OTHER PUBLICATIONS

VRG Controls, LLC, RCVC Red Circle Valve Controller, Platinum Natural Gas Solutions, https://static1.squarespace.com/static/5b1ea318710699a445e16ebe/t/60b9265415017769e5590b9e/1622746713798/VRG+Controls+-+RCVC+Red+Circle+Valve+Controller+PtNGS.pdf, date unknown, printed Feb. 8, 2024, 23 pages.

Baker Hughes, Becker DNGP Digital Natural Gas Positioner brochure, https://dam.bakerhughes.com/m/1494acde68f0e979/original/Becker-DNGP-Brochure-English.pdf, 11/20, printed Feb. 8, 2024, 8 pages.

Baker Hughes, Becker Valve Regulator Pilot, https://valves.bakerhughes.com/beckerbecker-productsvalve-regulator-pilot-becker, printed Feb. 8, 2024, 3 pages.

Air Squared Scroll Technology, Scroll Expander Produces 1KW of Quiet Power, https://airsquared.com/news/scroll-expander-produces-1-kw-of-quiet-power/, printed Feb. 8, 2024, 4 pages.

\* cited by examiner

LOW BLEED FLUID CONTROL SYSTEM

CROSS-REFERENCE TO RELATED APPLICATION

Not applicable.

BACKGROUND

Fluid control systems can be used in a variety of industrial, commercial, and other settings to regulate, protect, isolate, or maintain pipes, conduits, or other vessels and the flow of fluid therein (e.g., within a pipeline). However, typical control systems often vent a portion of the control fluid (e.g., pipeline gas), which can result in loss of valuable material (e.g., natural gas), and may incur regulatory consequences.

SUMMARY

Some embodiments of the invention provide a fluid control system for controlling flow of a process fluid through a pipeline. The fluid control system can include a valve arranged to control a flow of process fluid, an actuator configured to adjust a position of the valve, and a controller configured to control movement of the actuator. The system may include a switching valve in communication with the actuator and the controller. Further, a solenoid valve may be in communication with a first port of the switching valve. In one example, depending on pressure at the first port of the switching valve, the switching valve is operable in a first state to provide process fluid to the valve controller and permit movement of the actuator and in a second state to block flow of process fluid to the valve controller and block flow of process fluid from the pneumatic actuator. In another example, the solenoid valve is controllable to enable or disable pressurization of the first port of the switching valve by the process flow to control operation of the valve controller for movement of the pneumatic actuator.

Some embodiments of the invention provide a fluid control system for controlling flow of a process fluid through a pipeline. The fluid control system can include a valve controller configured to control a pneumatic actuator to adjust a position of a valve of a pipeline with process fluid from a process flow through a pipeline and a fluid switching arrangement disposed along a flow path between the valve controller and an upstream portion of the pipeline. In one example, the fluid switching arrangement is configured to selectively enable or disable flow of process fluid flow from the upstream portion of the pipeline to the valve controller, based on pressure in a downstream portion of the pipeline, to: supply process fluid to the valve controller to adjust the position of the valve, and provide a zero-bleed steady state for the valve controller.

Some embodiments of the invention provide a method of controlling fluid flow through a valve on a pipeline. The method may include monitoring a pressure in a downstream portion of a pipeline and based on the pressure in the downstream portion of the pipeline, operating a switching arrangement to selectively enable flow of process fluid from an upstream portion of the pipeline to a valve controller, and operating a valve controller, using the flow of process fluid through the switching arrangement, to adjust a position of the valve.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
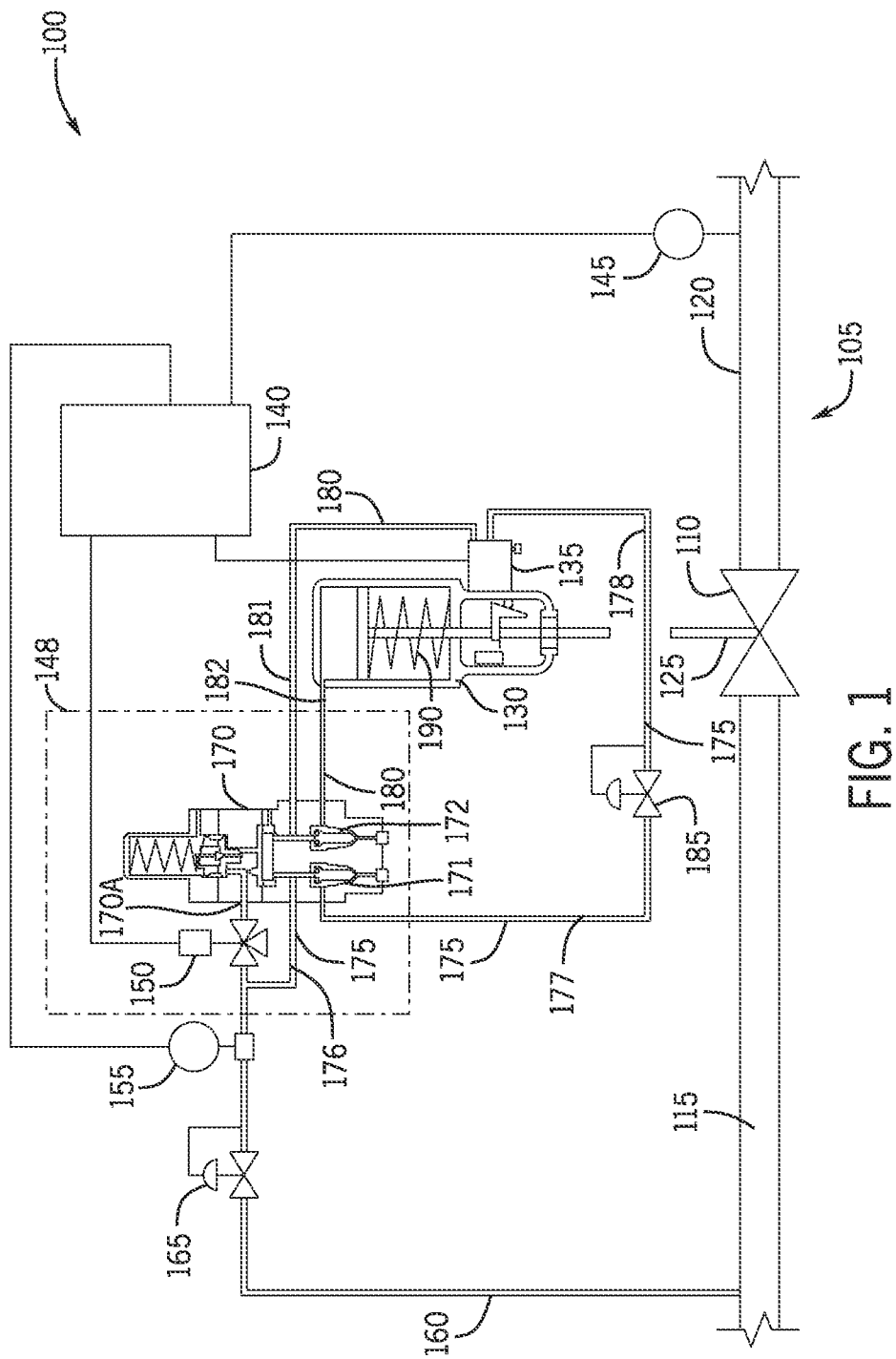
FIG. 1 is a schematic view of an example of a pipeline including a fluid control system according to aspects of the present disclosure.

The following discussion is presented to enable a person skilled in the art to make and use embodiments of the invention. Given the benefit of this disclosure, various modifications to the illustrated embodiments will be readily apparent to those skilled in the art, and the principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As briefly discussed above, fluid control systems can be used in a variety of industrial, commercial, and other settings to control fluid flow through pipes, conduits, or other vessels. However, some fluid control systems operate in a constant bleed or vent state, which results in the loss of valuable process fluid to the atmosphere. The loss of process fluid to the atmosphere can lead to an unnecessary loss of profit or product. Additionally, excessive venting of process fluid may incur certain regulatory consequences.

Embodiments of the invention can provide a zero-bleed fluid control system. The fluid control system may only enable the flow of process fluid to one or more instruments (e.g., controller, positioner, etc.) when needed to operate a valve via the one or more instruments. Generally, a switching arrangement can be configured to controllably provide flow of process fluid to a valve controller, for actuation of a control valve, only when a control system determines that operation of the valve controller is needed (e.g., when a downstream pipeline pressure is sufficiently different from a set-point pressure). Thus, for example, a pneumatic actuator can be selectively operated by a valve controller, using process fluid from a process flow, to control a valve. Further, the flow of process fluid to the valve controller can be prevented when operation of the actuator is not needed, so that there is zero bleed from the valve controller at steady state (i.e., when the actuator is not being moved).

In some examples, the system may include a remote control device (e.g., remote computer of generally known configuration(s)) configured to control the flow of process fluid to the one or more instruments via a switching arrangement. For example, the remote device may energize/deenergize (e.g., open/close) a solenoid valve to selectively change a state of a switching valve via flow (or non-flow) of process fluid to the switching valve. In one example, enabling flow to the switching valve, via opening the solenoid valve, places the switching valve in an open state and thereby allows process fluid flow to the one or more instruments to adjust a position of the valve. In another example, disabling flow to the switching valve, via closing the solenoid valve, places the switching valve in a closed state and thereby prevents process fluid to flow to the one or more instruments. Thus, when the switching valve is closed (i.e., solenoid is closed) the fluid control system does not vent/bleed any process fluid to the atmosphere.

In some examples, the switching valve may include a trip valve of various known types, with the open (or first) state corresponding to a reset state of the trip valve and the closed (or second) state corresponding to a tripped state of the trip valve. In other examples, other known types of similarly functional switching valves can be used. For example, any no-leak (e.g., soft seat) valve including a single input and two or more outputs, which are configured to operate in tandem (e.g., all outputs open and/or all outputs closed) may be used. Further, in some cases, a switching arrangement can include solenoid valve as a switching valve (e.g., a 6-way, 2-position solenoid valve).

In one example, the remote device may monitor a pressure sensor positioned on the downstream portion of the pipeline to determine a process error between a desired pressure in the downstream portion of the pipeline and an actual pressure in the downstream portion of the pipeline. When the process error is within a predetermined range, the remote device can block flow of process fluid to the one or more instruments (e.g., can close the solenoid to move the switching valve to a closed state), as the valve is at steady state. However, when the process error is outside of the predetermined range, the remote device opens can allow flow of process fluid to the one or more instruments (e.g., can open the solenoid to move the switching valve to an open state), to adjust the position of the valve. Once the process error is within the predetermined range, the remote device can then again block flow of process fluid to the one or more instruments (e.g., can again close the solenoid to move the switching valve to the closed state), to prevent unnecessary venting of process fluid.

FIG. 1 illustrates an example of a fluid control system 100 arranged on a pipeline 105. In one example, the pipeline 105 may be a natural gas pipeline. In one example, the pipeline 105 may include a valve 110 situated within a pipe of the pipeline 105. The valve 110 may control fluid flow rate, pressure, or other factors between an upstream portion 115 (with respect to valve 110) and a downstream portion 120 (with respect to valve 110) of the pipeline 105. The valve 110 may be any of a variety of known types. For example, the valve 110 may be a ball valve, gate valve, butterfly valve, diaphragm valve, globe valve, plug valve, check valve, or any other form of valve used to modify pipeline pressure or flow. In one particular example, the valve may be a push down to close valve with fail open actuation.

In the illustrated example, the valve 110 is in fluid communication with a process fluid (e.g., natural gas, oil, water, or other fluids) flowing through the pipeline 105. The valve 110 may be stroked (i.e., moved/actuated) via a pneumatic actuator 130 to close, open, or otherwise adjust a position of a valve stem 125 of the valve 110 to generate a predetermined pressure or flow rate of fluid in the downstream portion 120 of the pipeline 105. In one example, the actuator 130 may be a double acting piston type actuator. In another example, the actuator may be a single acting piston type actuator, or may have other known configurations. In some examples, the actuator may include a biasing element biasing element 190 (e.g., spring) configured to cause the actuator to "fail-open". In other examples, the biasing element may be positioned or configured to cause the actuator to "fail-closed". Thus, the biasing element biasing element 190 may operate the actuator in certain situations. For example, situations with insufficient differential pressure (dP) to operate the actuator 130.

In one example, the fluid control system 100, includes a controller 135 configured to control the actuator 130. For example, the controller may be in the form of a digital valve controller (DVC) of various known types. The controller 135 may control the position of the actuator 130 based on one or more signals from a remote device 140. The remote device 140 may be in the form of a remote computer, remote server, microprocessor, electronic controller, mobile device, or any other remote device (e.g., any variety of known digital control device). In one particular example, the controller 135 may receive a 4-20 mA signal from the remote device 140 corresponding to a predetermined valve travel (e.g., 0-100%). In other examples, the 4-20 mA signal from the remote device 140 may correspond to a predetermined pressure value (e.g., 3-15 psi). The remote device 140 may communicate with the controller 135 via a wired or wireless connection. In some examples, the remote device 140 may receive power (e.g., electrical power) from a generator, one or more solar panels, one or more power distribution lines, or any other power source.

The remote device 140 may be in further communication with a pressure sensor 145 configured to monitor a pressure in the downstream portion 120 of the pipeline 105. In one example, the remote device 140 may monitor the pressure sensor 145 to determine if an adjustment to the position of the valve 110 via the actuator 130 is needed. If the actuator 130 requires adjustment, the remote device 140 may send a signal to the controller 135 to effectuate adjustment of the actuator 130. The remote device 140 may further communicate with a flow meter 155 arranged on an inputline 160 of the fluid control system 100. The flow meter 155 may be configured to measure a flow rate of process fluid siphoned off of the upstream portion 115 of the pipeline 105 via the input line 160. In one example, the remote device 140 may record or document data received from the flow meter 155 for use in satisfying certain regulatory reporting requirements.

As mentioned previously, the input line 160 is configured to siphon process fluid off of the upstream portion 115 of the pipeline 105 for use in actuation of the actuator 130 via the controller 135. In one example, the process fluid siphoned from the upstream portion 115 of the pipeline 105 via the input line 160 may pass through a regulator 165 configured to reduce a pressure of process fluid in the input line 160 to a predetermined value. In some examples, the regulator 165 may be positioned upstream of the flow meter 155 on the input line 160.

To control the flow of process fluid to the controller 135, a switching arrangement 148 can be arranged fluidically between the upstream portion 115 of the pipeline and the actuator 130 and controller 135 (i.e., as shown, upstream of the actuator 130 and the controller 135) and downstream of the upstream portion 115, along the input line 160). Generally, the switching arrangement 148 can include a variety of valves of known types to selectively control flow from the upstream portion 115 of the pipeline to the actuator 130 and associated control devices (e.g., the controller 135, as shown), and in particular to selectively enable or block flow from the pipeline 105 to the control devices. In some examples, as noted above, the switching arrangement 148 can include one or more solenoid valves, including for control of flow to a switching valve (e.g., a trip valve as illustrated in particular and further detailed below), or for direct control of flow to a valve controller (e.g., with a 6-way, 2-position solenoid, which may not require a corresponding trip valve).

As shown in the illustrated example of FIG. 1, in particular, a switching valve 170 may be positioned on the input line 160, downstream of the regulator 165 and the flow meter 155. The switching valve 170 may be configured to enable process fluid flow to the controller 135 and process fluid flow from the controller 135 to the actuator 130 based on a supply of process fluid to a port 170A of the switching valve 170. Put differently, the switching valve 170 may be in a first state to enable process fluid flow to the controller 135 and process fluid flow from the controller 135 to the actuator 130 when process fluid of sufficient pressure is received at the port 170A from the input line 160. However, when the switching valve 170 does not receive process fluid of sufficient pressure at the port 170A (via the input line 160), the switching valve 170 switches to a second state to prevent flow of process fluid to the controller 135 and from the controller 135 and the actuator 130. Thus, when the switching valve 170 prevents flow to or from the controller 135 and the actuator 130, the fluid control system 100 does not bleed (i.e., vent) any process fluid to the atmosphere. However, when the switching valve 170 enables flow to or from the controller 135, the controller 135 can operate to power the actuator 130 but the fluid control system 100 may also bleed process fluid to the atmosphere. Thus, the configuration of the fluid control system 100 is known as a zero-bleed configuration where the fluid control system 100 is configured to only bleed or vent process fluid to the atmosphere when the actuator 130 actuates the valve 110. Put differently, when the valve 110 does not require movement (e.g., is at a steady state) the fluid control system 100 does not bleed or vent process fluid.

In the illustrated example, the switching valve 170 is a trip valve of known configuration, which can be "tripped" to prevent flow when pressure at the port 170A is reduced below a set-point and can be "reset" to allow flow when the pressure at the port 170A is at or above a set-point. In other examples, however, other types of switching valves with similar functionality can be used.

As described above, the switching valve 170 is configured to trip or reset based on whether or not the switching valve 170 receives process fluid at the port 170A via the input line 160. To control the flow of process fluid into the port 170A a solenoid valve 150 is positioned upstream of the switching valve 170, downstream of the regulator 165 and the flow meter 155. The solenoid valve 150 may be controlled (e.g., energized/deenergized, opened/closed) via the remote device 140 (or otherwise, including as further detailed below).

In one example, the solenoid valve 150 is opened/closed by the remote device 140 based on an error value between the current, measured, pressure/flow rate in the downstream portion 120 and the required pressure/flow rate in the downstream portion 120. Thus, as described above, the remote device 140 may selectively open/close the solenoid valve 150 to reduce overall emissions (e.g., bleed/vent of process fluid). For example, the remote device 140 may only open the solenoid valve 150, thereby enabling process fluid flow to/from the controller 135 via the switching valve 170, when actuation of the valve 110 is required to bring the error value within a predetermined range. In another example, the remote device 140 may close the solenoid valve 150 when the error value between the current, measured, pressure/flow rate in the downstream portion 120 and the required pressure/flow rate in the downstream portion 120 is below a predetermined range. Thus, the overall volume of process fluid bled/vented to the atmosphere is reduced (e.g., reduced to zero during steady state of the actuator 130 and controller 135).

In one example, the solenoid valve 150 may be configured to fail open (e.g., fail open when deenergized) to enable process fluid flow to the port 170A of the switching valve 170 and thereby to enable operation of the fluid control system 100 during periods without power. However, in other examples, the solenoid valve 150 may be configured to fail closed (e.g., fail closed when deenergized) to prevent process fluid flow to the port 170A and thereby to prevent excessive bleed/vent of process fluid during periods without power.

To facilitate control of the actuator 130 via the controller 135, the controller 135 includes a supply line 175 and an output line 180. In one example, the supply line 175 may include one or more segments or portions with variable pressures depending on a status of the switching valve 170. For example, a first supply line segment 176, between the input line 160 and the switching valve 170 may be at a constant pressure equal (e.g., regardless of the status of the switching valve 170) to a pressure regulated within the input line 160 via the regulator 165. A second supply line segment 177, between the switching valve 170 and a supply pressure regulator 185, may be at a pressure equal to the pressure in the first supply line segment 176 when the switching valve 170 is open. However, the second supply line segment 177 may be at a different, lower, pressure than the first supply line segment 176 when the switching valve 170 is closed (e.g., second supply line segment 177 bleeds gas through pneumatic instrument to atmosphere, pressure in second supply line segment 177 goes to zero (0) when switching valve 170 is closed). A third supply line segment 178, between the supply pressure regulator 185 and an instrument, may be at a pressure set by the supply pressure regulator 185 when the switching valve 170 is open. However, the third supply line segment 178 may be at a different, lower, pressure than the first line segment 176 when the switching valve 170 is closed (e.g., third supply line segment 178 bleeds gas through pneumatic instrument to atmosphere, pressure in third line segment 178 goes to zero (0) when switching valve 170 is closed).

Correspondingly, the output line 180 may include one or more segments or portions with variable pressures depending on a status of the switching valve 170. For example, a first output line segment 181, between the instrument and the switching valve 170, may be at a pressure as determined by the instrument (e.g., controller 135) when the switching valve 170 is open. However, when the switching valve 170 is closed, the first output line segment 181 may be at a different, lower, pressure. For example, the first output line segment 181 bleeds gas through the instrument (e.g., controller 135). Thus, pressure in the first output line segment 181 goes to zero (0) when switching valve 170 is closed. A second output line segment 182, between the switching valve 170 and the actuator 130, may be at a pressure equal to the pressure in the first output line segment 181 when the switching valve 170 is open. However, when the switching valve 170 is closed, the pressure in the second output line segment 182 may remain constant (e.g., no bleed/leak) to lock or hold the position of the valve 110 via the actuator. Thus, the system 100 is able to maintain the position of the valve 110 without the need for excessive venting/bleeding of process fluid.

In one example the supply line 175 is configured to supply process fluid to the controller 135, which is regulated or metered via the controller 135 based on the amount of movement of the actuator 130 required. The metered process fluid flows from the controller 135 via the output line 180 into the actuator 130, which adjusts the position of the valve 110 via actuation of the valve stem 125.

To prevent the flow of process fluid to/from the controller 135 when the valve 110 is at steady state, the valve 170 is arranged along both the supply line 175 and the output line 180. Thus, process fluid is unable to reach the controller 135 via the supply line 175 downstream of the switching valve 170 when the switching valve 170 is closed (e.g., when the solenoid valve 150 is closed). Correspondingly, metered process fluid is unable to reach the actuator 130 via the output line 180 downstream of the switching valve 170 when the switching valve 170 is closed (e.g., when the solenoid valve 150 is closed). Alternatively, when the switching valve 170 is open (e.g., when the solenoid valve 150 is open) a portion of the process fluid can flow from the input line 160 via the supply line 175 and passes freely through the switching valve 170. Thus, the switching valve 170 is configured to operate a first valve 171, positioned on the supply line 175, in tandem with a second valve 172, positioned on the output line 180. Put differently, the first valve 171 and the second valve 172 actuate together between an open/closed valve position. Thus, when the first valve 171 is closed the second valve 172 is closed and vice versa. Correspondingly, when the first valve 171 is open the second valve 172 is open.

In the illustrated example, the process fluid within the supply line 175 passes through a supply pressure regulator 185 arranged on the supply line 175. The supply pressure regulator 185 is configured to reduce the pressure of the process fluid to a predetermined value for use by the controller 135. The process fluid then flows into the controller 135, which meters the process fluid based on a signal from the remote device 140. The metered process fluid then flows through the output line 180 and passes freely through the switching valve 170 into the actuator 130. As mentioned previously, the metered process fluid can thus be used to adjust the position of the valve 110 via movement of the valve stem 125.

Figure 2:
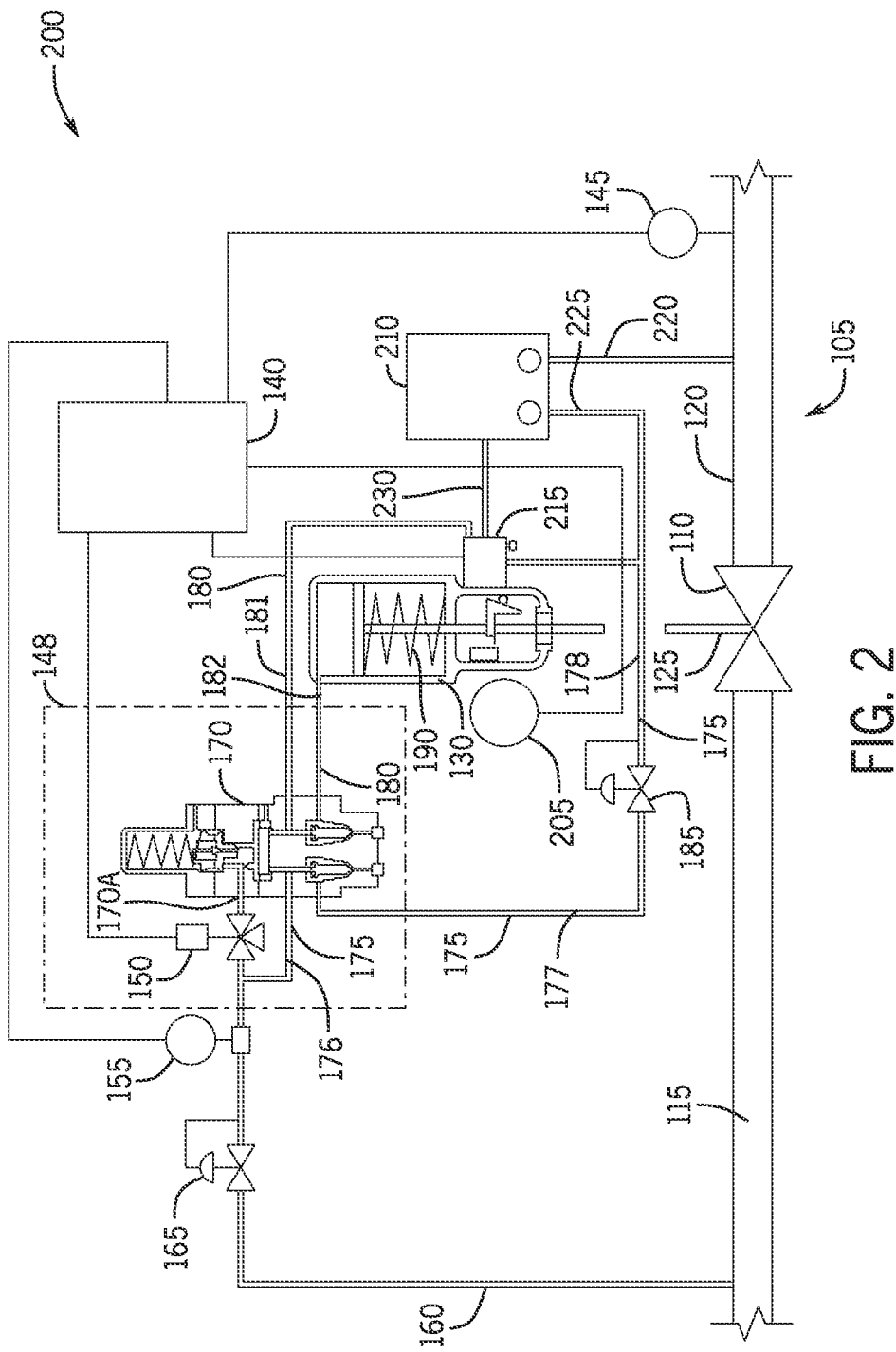
FIG. 2 is a schematic view of the pipeline of FIG. 1 including another configuration of the fluid control system according to aspects of the present disclosure.

FIG. 2 illustrates another example of a fluid control system 200 that can be used with the pipeline 105 of FIG. 1 (e.g., as an alternative configuration of the fluid control system 100). As will be recognized, the fluid control system 200 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the fluid control system 200.

In the fluid control system 200 of FIG. 2, the controller 135 (e.g., a DVC) is replaced with a pneumatic controller 210 and a pneumatic positioner 215 configured to control the position of the valve 110 via the actuator 130. To monitor a position of the actuator 130, the fluid control system 200 can also include a position sensor 205 positioned adjacent the actuator 130. The position sensor 205 is configured to communicate via the remote device 140 via wired or wireless communication such that the remote device 140 may monitor the position of the actuator 130.

As mentioned previously, the pneumatic controller 210 and the positioner 215 are configured to control actuation of the valve 110 via the actuator 130. In one example, the controller 210 is configured to monitor a pressure in the downstream portion 120 of the pipeline 105 via a reference line 220. The controller 210 is further configured to provide an output pressure signal to the positioner 215 via a control line 230 based on a pressure in the downstream portion 120 of the pipeline 105. To generate the output pressure signal, the controller 210 receives process fluid via an input line 225 (a branch of the supply line 175 described previously) and generates the output pressure signal based on the pressure in the downstream portion 120 as determined via the reference line 220. In one example, the output pressure signal passes via the control line 230 into the positioner 215 to control an output from the positioner 215 to the actuator 130 (e.g., used to adjust the valve 110 via the actuator 130).

The positioner 215 is configured to receive process fluid from the supply line 175 and regulate/adjust the process fluid to provide a control signal along the line 180 based on the output received via the control line 230 from the controller 210. Thus, the combination of the controller 210 and positioner 215 may be used to adjust the position of the valve 110 based on the pressure in the downstream portion 120 of the pipeline 105. Unlike the controller 135 discussed previously, the controller 210 and positioner 215 do not rely on electrical power to operate. Thus, the controller 210 and positioner 215 may continue to control the position of the valve 110 regardless of the presence/absence of electrical power. However, as described previously, the controller 210 and positioner 215 may be rendered inoperable (i.e., valve 110 rendered inoperable) when the remote device 140 closes the solenoid valve 150 and thereby trips the switching valve 170. Thus, the remote device 140 may close the solenoid valve 150 and trip the switching valve 170 when the process error is within a predetermined threshold to prevent unnecessary venting/bleeding of process fluid via the controller 210 and positioner 215. When the process error is outside of the predetermined threshold, the remote device 140 may open the solenoid valve 150 and reset the switching valve 170 to enable movement of the valve 110 via the controller 210 and the positioner 215. As mentioned previously, this configuration is known as a zero-bleed configuration, which mitigates the amount of process fluid vented/bled to the atmosphere.

In some examples, the controller 210 may be replaced by a low bleed pilot device of various known configurations. In other examples, both the controller 210 and the positioner 215 may be replaced by a low bleed pilot device based on user preferences.

Figure 3:
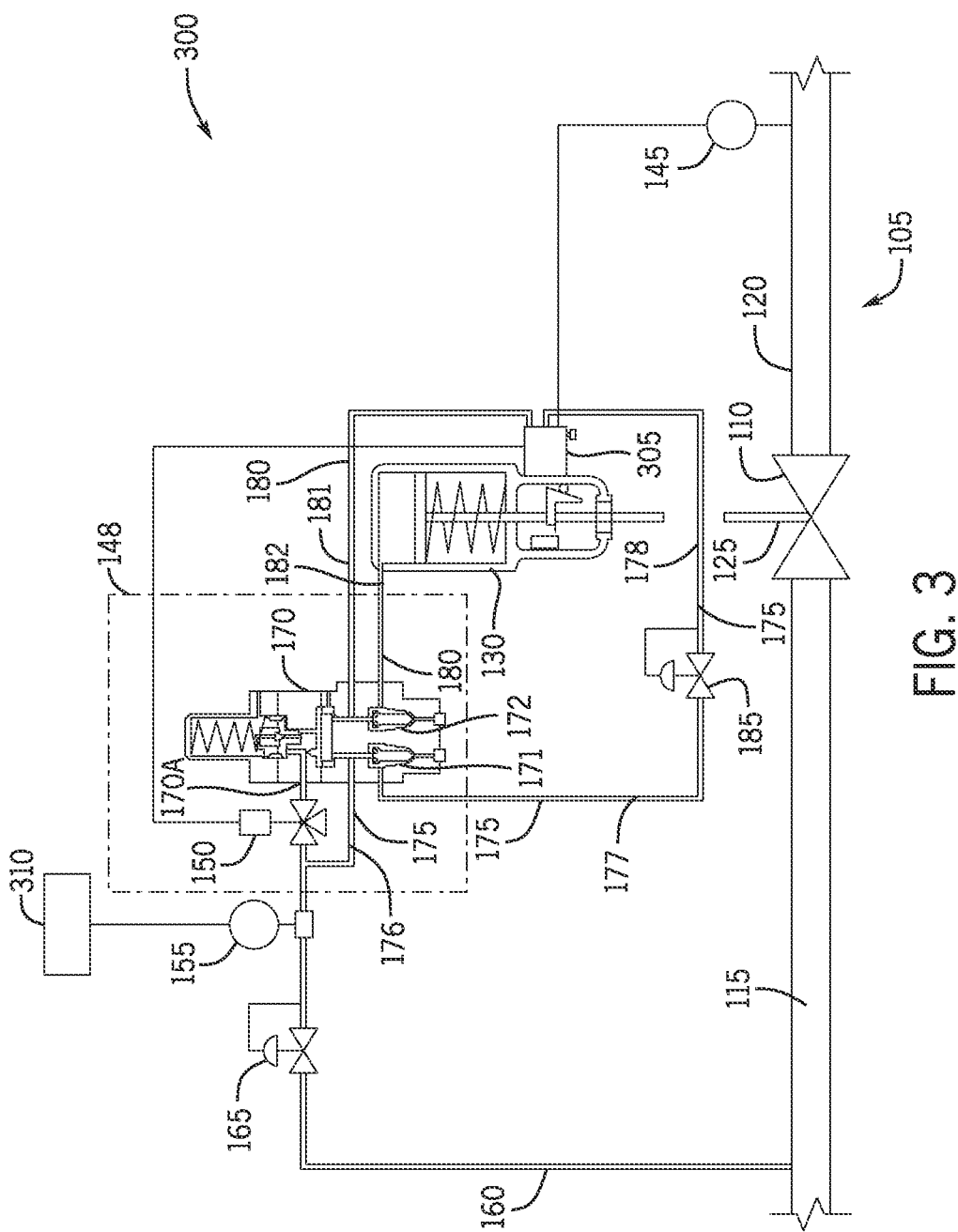
FIG. 3 is a schematic view of the pipeline of FIG. 1 including yet another configuration of the fluid control system according to aspects of the present disclosure.

FIG. 3 illustrates another example of a fluid control system 300 that can be used with the pipeline 105 of FIG. 1 (e.g., as an alternative configuration of the fluid control system 100). As will be recognized, the fluid control system 300 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the fluid control system 300.

In situations where a remote device 140 is not available (or desired), a controller 305 (e.g., a digital process controller (DPC)) may be configured to control actuation of the valve 110 via the actuator 130. In lieu of the remote device 140, the controller 305 is configured to communicate with the pressure sensor 145 to monitor a pressure/flow rate in the downstream portion 120 of the pipeline 105. Based on the pressure/flow rate in the downstream portion 120, the controller 305 is configured to regulate/adjust a pressure or flow of process fluid received via the supply line 175 to be outputted via the output line 180. As mentioned previously, the regulated process fluid outputted from the controller 305 via the output line 180 can then be used to adjust a position of the valve 110 via the actuator 130. In one example, the controller 305 is further configured to control operation of the solenoid valve 150 based on a sensed pressure in the downstream portion 120 of the pipeline 105 or another control value (e.g., energize/deenergize the solenoid valve 150). For example, the controller 305 is configured to energize/deenergize a low-power solenoid valve (e.g., less than 1 watt).

As described previously, the controller 305 may be rendered pneumatically inoperable for actuation of the valve 110 (i.e., valve 110 held in steady state) when the controller 305 closes the solenoid valve 150 and thereby trips the switching valve 170. Thus, the controller 305 may close the solenoid valve 150 and trip the switching valve 170 when the process error is within a predetermined threshold to prevent unnecessary venting/bleeding of process fluid via the controller 305. When the process error is outside of the predetermined threshold, the controller 305 may open the solenoid valve 150 and reset the switching valve 170 to enable movement of the valve 110 via the controller 305. As mentioned previously, this configuration is known as a zero-bleed configuration, which mitigates the amount of process fluid vented/bled to the atmosphere.

Without the remote device 140, the fluid control system 300 may include a totalizer 310 in communication with the flow meter 155. The totalizer 310 may be configured to monitor the flow meter 155 to generate values of total process fluid consumed or vented by the fluid control system 300. Thus, certain regulatory reporting requirements may be satisfied.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "substantially parallel" indicates a direction that is within ±12 degrees of a reference direction (e.g., within ±6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Also as used herein, unless otherwise limited or defined, "substantially perpendicular" indicates a direction that is within ±12 degrees of perpendicular a reference direction (e.g., within ±6 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±30%, inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A fluid control system, comprising:
a valve arranged to control a process flow of process fluid;
a pneumatic actuator configured to adjust a position of the valve;
a valve controller configured to control movement of the pneumatic actuator;
a switching valve in fluid communication with the pneumatic actuator and the valve controller; and
a solenoid valve in fluid communication with a first port of the switching valve;
wherein, depending on pressure at the first port of the switching valve, the switching valve is operable: in a first state to provide flow of the process fluid to the valve controller and permit movement of the pneumatic actuator; and in a second state to block flow of the process fluid to the valve controller and block flow of process fluid from the pneumatic actuator; and
wherein the solenoid valve is controllable to enable or disable pressurization of the first port of the switching valve by the process flow to control operation of the valve controller for movement of the pneumatic actuator.

2. The fluid control system of claim 1, wherein the valve controller is powered by process fluid from the process flow upstream of the valve, via the switching valve.

3. The fluid control system of claim 2, wherein the solenoid valve is configured to controllably block flow of the process fluid to the first port of the switching valve to place the switching valve in the second state and thereby provide zero steady state bleed from the fluid control system.

4. The fluid control system of claim 1, wherein the switching valve is a trip valve, the first state is a reset state, and the second state is a tripped state.

5. The fluid control system of claim 4, wherein the solenoid valve is configured to be depowered to reset the trip valve, to provide the flow of process fluid to the valve controller via the trip valve; and
wherein the solenoid valve is configured to be powered to trip the trip valve, to disable the flow of process fluid to the valve controller.

6. The fluid control system of claim 1, further comprising:
a remote digital controller configured to control the solenoid valve to enable or disable pressurization of the first port of the switching valve.

7. The fluid control system of claim 6, wherein the remote digital controller is configured to control the solenoid valve based on signals from one or more of: a pressure sensor arranged downstream of the valve; a flow meter arranged upstream of the solenoid valve; or a position transducer arranged to monitor movement of the pneumatic actuator.

8. The fluid control system of claim 1, wherein the valve controller is in fluid communication with the switching valve and electronic communication with the solenoid valve and is configured to: electronically control the solenoid valve based on a pressure of the process flow downstream of the valve; and pneumatically power the pneumatic actuator with process fluid received via the switching valve.

9. The fluid control system of claim 1, wherein the valve controller is a pneumatic pressure controller in fluid communication with the switching valve; and
wherein the fluid control system further comprises:
a pneumatic positioner in fluid communication with the pneumatic pressure controller and the switching valve;
wherein the pneumatic positioner is configured to adjust the position of the pneumatic actuator based on fluid signals from the pneumatic pressure controller.

10. A fluid control system, comprising:
a valve controller configured to meter a flow of process fluid to control a pneumatic actuator to adjust a position of a valve of a pipeline with process fluid from process fluid flow through a pipeline;
a fluid switching arrangement disposed along a flow path between the valve controller and an upstream portion of the pipeline;
wherein the fluid switching arrangement is configured to selectively enable or disable flow of process fluid flow from the upstream portion of the pipeline to the valve controller, based on pressure in a downstream portion of the pipeline, to: supply process fluid to the valve controller to adjust the position of the valve; and provide a zero-bleed steady state for the valve controller.

11. The fluid control system of claim 10, wherein the fluid switching arrangement includes a six-way, two-position solenoid valve.

12. The fluid control system of claim 10, wherein the fluid switching arrangement includes a trip valve that is upstream of and in fluid communication with the valve controller, the trip valve being in communication with the upstream portion of the pipeline via a solenoid valve; and wherein one or more of the valve controller or a remote control device is configured to operate the solenoid valve to selectively trip or reset the trip valve based on the pressure in the downstream portion of the pipeline.

13. The fluid control system of claim 12, wherein the one or more of the valve controller or the remote control device is configured to operate the solenoid valve, based on the pressure in the downstream portion of the pipeline, to selectively:

pressurize a first port of the trip valve, to reset the trip valve and allow flow of the process fluid from the upstream portion of the pipeline to the valve controller; and block the first port of the trip valve, to trip the trip valve and prevent flow of the process fluid from the upstream portion of the pipeline to the valve controller.

14. The fluid control system of claim 13, wherein the one or more of the valve controller or the remote control device is configured to power the solenoid valve to block the first port of the trip valve.

15. The fluid control system of claim 14, wherein the one or more of the valve controller or the remote control device is configured to depower the solenoid valve to pressurize the first port of the trip valve.

16. The fluid control system of claim 10, wherein the valve controller is a digital valve controller configured to be electronically controlled by a remote control device based on the pressure in the downstream portion of the pipeline.

17. The fluid control system of claim 16, wherein the remote control device is further configured to electronically control the fluid switching arrangement based on the pressure in the downstream portion of the pipeline.

18. A method of controlling fluid flow through a valve on a pipeline, comprising:

monitoring a pressure in a downstream portion of a pipeline; and based on the pressure in the downstream portion of the pipeline;

operating a switching arrangement to selectively enable flow of process fluid from an upstream portion of the pipeline to a valve controller; and operating the valve controller, using the flow of process fluid through the switching arrangement, to adjust a position of the valve via a metered flow of process fluid from the valve controller.

19. The method of claim 18, wherein the switching arrangement includes a switching valve and a solenoid valve; and wherein flow of process fluid through the switching valve is disabled when the solenoid valve is closed, to provide zero-bleed steady state at the valve controller.

20. The method of claim 19, wherein the flow of process fluid through the switching valve is enabled when the solenoid valve is open.

* * * * *